Figure 1:
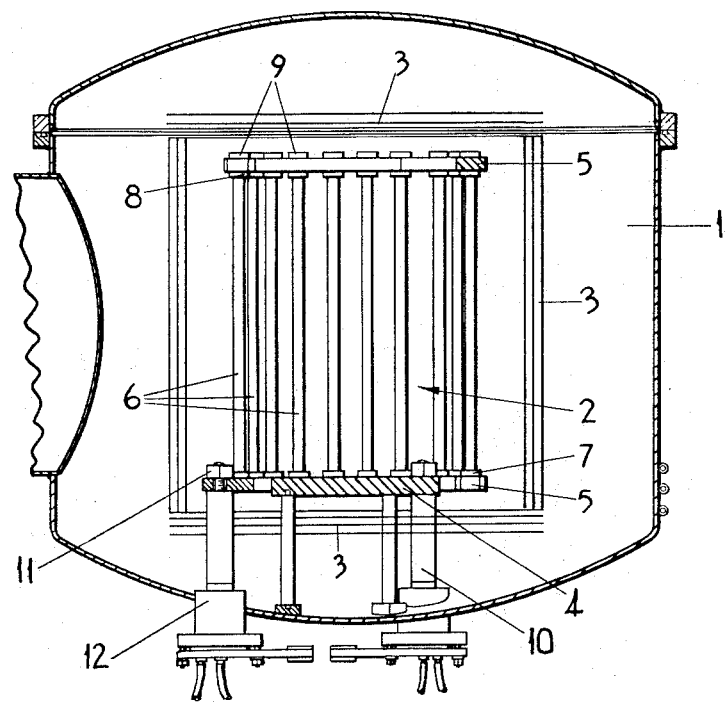

Oct. 10, 1961 M. DONOVAN ET AL 3,004,090
HEATING ELEMENT ASSEMBLIES FOR ELECTRIC FURNACES
Filed March 26, 1959 2 Sheets-Sheet 1

INVENTORS
MAURICE DONOVAN
MICHAEL JOHN SEVERS

BY Kirschstein, Kirschstein & Ottinger
ATTORNEYS

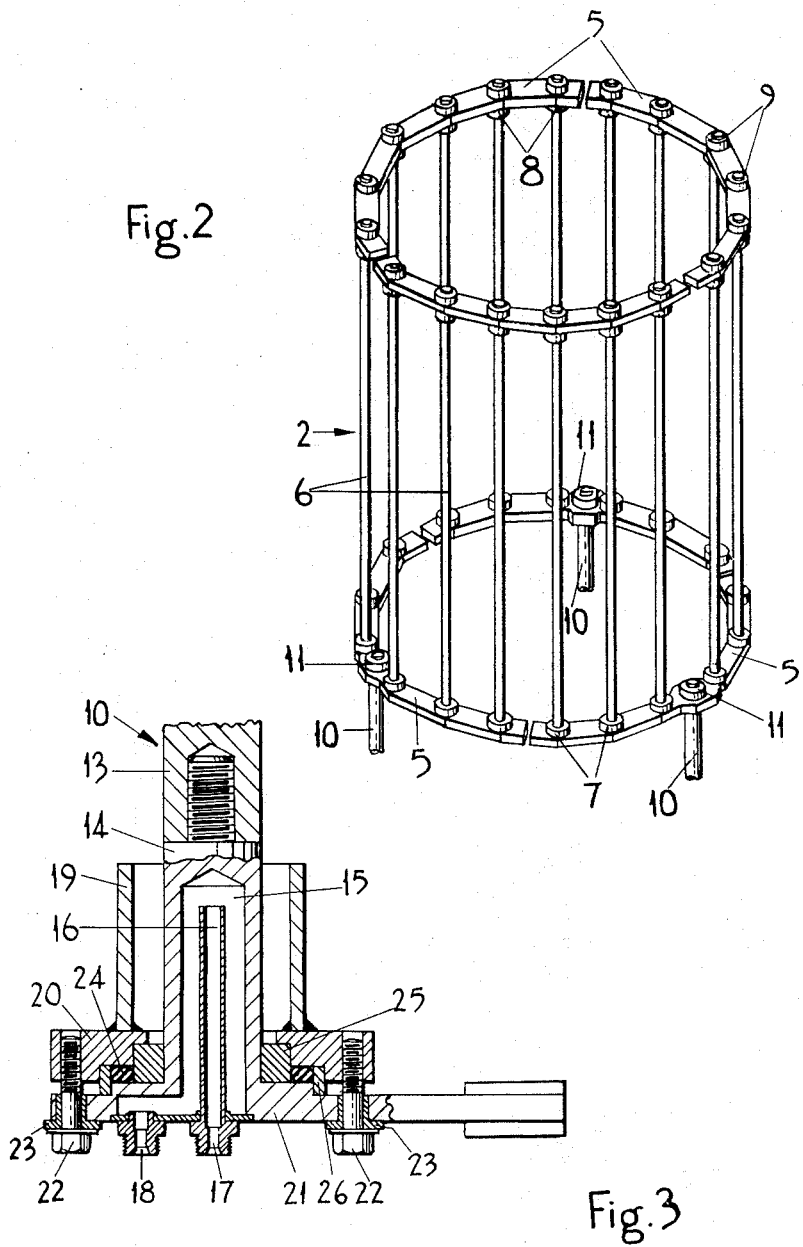

United States Patent Office 3,004,090
Patented Oct. 10, 1961

3,004,090
**HEATING ELEMENT ASSEMBLIES FOR
ELECTRIC FURNACES**
Maurice Donovan, Northwood, and Michael John Severs, Ealing, London, England, assignors to The General Electric Company Limited, London, England
Filed Mar. 26, 1959, Ser. No. 802,098
Claims priority, application Great Britain Apr. 1, 1958
3 Claims. (Cl. 13—25)

The present invention relates to heating element assemblies for electric furnaces, such, for example, as vacuum furnaces and furnaces in which heating takes place in an inert or other non-oxidising atmosphere.

According to the present invention a heating element assembly for an electric furnace comprises a plurality of arcuate graphite busbar members, and a plurality of graphite rods disposed to form a cage defining a generally cylindrical heating space, each rod extending between two busbar members.

The said bars, rods or the like may be located at their ends in holes or sockets in said busbar like members.

The graphite rods may extend the length of the cage and the busbar members are then arranged to form a pair of end rings, one at each end of the cage. With such an arrangement, there may be a plurality of separated busbar members in each end ring, the same number in each, and with the busbar members in one end ring of said cage angularly displaced about the longitudinal axis of the cage relatively to the busbar members in the other end. With this arrangement the group of rods associated with a busbar member in one end is associated with two busbar members in the other end ring. Such an arrangement may include three busbar like members in each end ring and the three at one end may be adapted for connecting one to each phase of a three phase supply so that a delta connected heating element assembly is provided.

Alternatively a plurality of said busbar like members may be provided in one end ring, and a single one at the other end the single one comprising a closed ring i.e. an unbroken ring. The plurality of the busbar members in the one end ring being adapted for connecting one to each phase of a polyphase supply so that a star connected heating element assembly is provided.

The busbar like members at one end may be mounted on posts and such posts may form part of the electrical connecting means for connecting the assembly to a three phase supply.

In order that the invention may be readily understood one construction and minor modifications thereof will now be described by way of example with reference to the three figures of the accompanying drawings in which FIGURE 1 shows a sectional elevation of a vacuum furnace embodying the element assembly of the invention, FIGURE 2 shows a perspective view of the element assembly and FIGURE 3 shows an enlarged sectional view of a detail.

Referring now to the drawings, the vacuum furnace comprises a vacuum chamber 1 and within the vacuum chamber 1, a heating element assembly 2, of graphite, surrounded by an enclosure 3 acting as a radiation screen. The radiation screen 3 may be as described in the specification of co-pending patent application Serial No. 802,205, filed March 26, 1959. A platform or hearth 4 is provided for carrying the charge being furnaced.

The heating element assembly 2 which may be arranged to raise the temperature of the parts being furnaced to a value as high as say 2500° C. comprises graphite busbar members 5 (see particularly FIGURE 2) of arcuate form and a number of graphite rods 6, each of the rods 6 extending between a pair of the busbar members 5. The busbar members 5 and the rods 6 form a cage as can be seen clearly from FIGURE 2 and define a generally cylindrical heating space or enclosure.

There are six of the busbar members 5, three at each end of the cage forming an end ring for the cage. The three at the lower end of the cage are provided with threaded bores or apertures into which the lower threaded ends of the rods 6 are screwed. Graphite locknuts 7 secure the rods 6 in position. The three busbar members 5 at the upper end are provided with bores or apertures through which the rods 6 pass with a clearance fit and each of the rods 6 at this end is secured to the busbar members 5 by graphite nuts 8 and 9, fitted on the threaded end of the rod 6, the nut 8 being fitted below the busbar member 5 and the nut 9 being fitted above the busbar member 5.

The busbar members 5 at each end are disposed at an angle of 120° to each other about the longitudinal axis of the cage and the busbar members 5 at the upper end are angularly displaced about the longitudinal axis of the cage by an angle of 60° relatively to the busbar members 5 at the lower end. Each busbar member 5 accommodates the ends of an even number such as six as shown of the rods 6, so that the rods 6 in each of the lower busbar members 5 are accommodated in two of the upper busbar members 5 and vice versa.

Each of the lower busbar members 5 is provided with a bore midway along its length through which passes the threaded end of a terminal post 10, secured to the busbar member 5 by a graphite nut 11, and extending through the base of the radiation screen 3 and through a vacuum seal 12 (shown in detail in FIGURE 3) in the lower wall of the chamber 1. The terminal posts 10 serve as legs for supporting the cage and each has a graphite end part 13 to which is screwed a metal post 14. The metal part 14 has an internal bore 15 for water cooling purposes and in this bore 15 is welded a tube 16 disposed coaxially of the bore 15 and forming with the bore a circuit for cooling water. An inlet 17 and an outlet 18 for cooling water is provided.

The terminal posts 10 pass through tubular portions 19 welded into apertures provided into the lower wall of the chamber 1 and an annulus 20 is welded onto the tubular portion 19. A flange 21 is provided on the ends of each of the terminal posts 10 and the annulus 20 and the flanges 21 are connected to each other by four bolts 22 disposed symmetrically around the axis of the terminal post 10. Insulating members 23 serve to electrically insulate the chamber 1 from the terminal post 10. The vacuum seal is effected by a sealing ring 24 which is sandwiched between the annulus 20 and flange 21. Rings 25 and 26 of electrically insulating material, serve to space the annulus 20 and flange 21.

In operation of the furnace the three terminal posts are each connected to one phase of a three phase supply and thus the element assembly 2 provides a delta connected arrangement.

With an arrangement as described above, due to the curvature of the busbar members, a larger heating space is provided than when straight busbar members are used since in the latter case the heating space must be polygonal in cross-section. Further the circular cross-section provided means that the heating elements are equidistant from the longitudinal axis of the heating space and this combined with the regular spacing of the bars around the enclosure makes for uniformity of temperature at all points within the enclosure.

With the above described construction, should one of the rods 6 fail then it can be removed merely by removing the upper busbar like member 5 in which it is located and then unscrewing it from its lower busbar like member 5.

We claim:

1. A heating element assembly for an electric furnace, comprising a plurality of graphite rods which are screw-threaded at their ends, a plurality of curved graphite busbar members arranged to form a pair of end rings between which each of said graphite rods extends to form a generally cylindrical cage, said rods being located in bores in said busbar members and secured to said busbar members by a screw-threaded connecting arrangement, and a plurality of graphite posts secured to one of said end rings each post being secured to a respective one of said busbar members through a screw-threaded connecting arrangement and serving as the sole support for said cage and as electrical terminal posts through which said assembly is connectable to an electric supply.

2. A heating element assembly for an electric furnace, comprising a plurality of graphite rods which are screw-threaded at their ends, a plurality of curved graphite busbar members arranged to form a pair of end rings between which each of said graphite rods extends to form a generally cylindrical cage, said busbar members having bores which in one end ring are threaded to engage the screw-thread at one end of said rods and in the other end provide a clearance fit for the rods, graphite nuts screwed onto said rods to secure said rods to said other of the end rings, and a plurality of graphite posts screwed into one of said end rings and extending in the direction of the longitudinal axis of the cage away from said cage to serve as the sole support for said cage and as electrical terminal posts through which said assembly is connectable to an electric supply.

3. In an electric furnace, a heating element assembly comprising a plurality of graphite rods which are screw-threaded at their ends, a plurality of curved graphite busbar members arranged to form a pair of end rings between which each of said graphite rods extends to form a generally cylindrical cage, said rods being located in bores in said busbar members and secured to said busbar members by a screw-threaded connecting arrangement, and a plurality of graphite posts secured to one of said end rings, each post being secured to a respective one of said busbar members through a screw-threaded connecting arrangement, and extending in the direction of the longitudinal axis of the cage away from said cage to serve as legs supporting said cage with its longitudinal axis vertical and as electrical terminal posts through which said assembly is connectable to an electric supply.

References Cited in the file of this patent

UNITED STATES PATENTS

| | | |
|---|---|---|
| 1,496,299 | Clifford | June 3, 1924 |
| 1,498,990 | Beyer | June 24, 1924 |
| 1,528,542 | Hancock et al. | Mar. 3, 1925 |
| 2,337,679 | Osterberg | Dec. 28, 1943 |
| 2,472,613 | Poland | June 7, 1948 |
| 2,491,579 | Poland | Dec. 20, 1948 |
| 2,516,474 | Melsted | July 25, 1950 |
| 2,634,969 | Hansgirg | Apr. 14, 1953 |